(12) United States Patent
Geradts (10) Patent No.: US 9,579,979 B2
(45) Date of Patent: Feb. 28, 2017

(54) SUPPLY OF ELECTRIC ENERGY TO ELECTRIC TRACTION MOTORS AND ADDITIONAL ELECTRIC AUXILIARIES OF A RAILWAY VEHICLE

(71) Applicant: Bombardier Transportation GmbH, Berlin (DE)

(72) Inventor: Karlheinz Geradts, Staufen (CH)

(73) Assignee: Bombardier Transportation GmbH, Berlin (DE)

( * ) Notice: Subject to any disclaimer, the term of this patent is extended or adjusted under 35 U.S.C. 154(b) by 31 days.

(21) Appl. No.: 14/412,495

(22) PCT Filed: Jul. 2, 2013

(86) PCT No.: PCT/EP2013/063977
§ 371 (c)(1),
(2) Date: Mar. 19, 2015

(87) PCT Pub. No.: WO2014/006065
PCT Pub. Date: Jan. 9, 2014

(65) Prior Publication Data
US 2015/0314687 A1 Nov. 5, 2015

(30) Foreign Application Priority Data
Jul. 3, 2012 (DE) .......................... 10 2012 211 543

(51) Int. Cl.
*B60L 11/02* (2006.01)
*B61C 9/38* (2006.01)
(Continued)

(52) U.S. Cl.
CPC ................. *B60L 11/02* (2013.01); *B60L 1/00* (2013.01); *B60L 1/003* (2013.01); *B60L 3/003* (2013.01);
(Continued)

(58) Field of Classification Search
CPC .. B60L 11/02; B60L 1/00; B60L 1/003; B60L 3/003
(Continued)

(56) References Cited

U.S. PATENT DOCUMENTS 4,853,553 A * 8/1989 Hosie ...................... B60L 1/003
290/40 C
6,018,233 A * 1/2000 Glennon ................. F02N 11/04
290/36 R
(Continued)

FOREIGN PATENT DOCUMENTS

DE 10341774 A1 4/2005
WO 2009040211 A2 4/2009
(Continued)

*Primary Examiner* — Tulsidas C Patel
*Assistant Examiner* — Thomas Quigley
(74) *Attorney, Agent, or Firm* — The Webb Law Firm (57) ABSTRACT

An arrangement for supplying electric energy to traction motors and auxiliaries of a railway vehicle includes, at least two internal-combustion engines, each in combination with an assigned electric machine. At least one internal-combustion engine/machine combination is operated, whereupon the electric machine generates alternating current during a generator mode of operation, which alternating current, in a first operating mode, is rectified by at least one generator rectifier and supplied to a direct-current link in the form of direct current. The direct-current link supplies electric energy to at least one traction motor of the railway vehicle. In the first operating mode, electric energy from the direct-current link is supplied to the auxiliaries via an auxiliaries inverter and via an auxiliaries connector. In a second operating mode the auxiliaries inverter is out of operation, and which is an emergency operation condition, electric energy is supplied to the auxiliaries by the electric machine of one
(Continued)

of the internal-combustion engine/machine combination through an emergency operation electric line.

18 Claims, 2 Drawing Sheets

(51) Int. Cl.
  *B60L 1/00* (2006.01)
  *B60L 11/12* (2006.01)
  *B60L 3/00* (2006.01)
  *B60L 11/08* (2006.01)

(52) U.S. Cl.
  CPC ............ *B60L 3/0092* (2013.01); *B60L 11/08* (2013.01); *B60L 11/123* (2013.01); *B60L 2200/26* (2013.01); *B60L 2210/30* (2013.01); *B60L 2210/40* (2013.01); *B60L 2220/42* (2013.01); *Y02T 10/6217* (2013.01); *Y02T 10/648* (2013.01); *Y02T 10/7077* (2013.01); *Y02T 10/7241* (2013.01)

(58) Field of Classification Search
  USPC .................................................. 290/4 R, 45
  See application file for complete search history.

(56) References Cited

U.S. PATENT DOCUMENTS

| | | | | |
|---|---|---|---|---|
| 6,037,752 | A * | 3/2000 | Glennon | F02N 11/04 307/19 |
| 7,401,558 | B2 | 7/2008 | Foesel | |
| 2006/0025902 | A1* | 2/2006 | Brown | B60L 1/02 701/19 |
| 2008/0121136 | A1* | 5/2008 | Mari | B60L 11/02 105/35 |
| 2009/0256419 | A1* | 10/2009 | Anghel | F02N 11/04 307/9.1 |
| 2011/0080040 | A1* | 4/2011 | Kumar | B60L 11/123 307/9.1 |
| 2011/0315043 | A1 | 12/2011 | Kumar | |
| 2011/0316333 | A1 | 12/2011 | Still | |
| 2013/0333635 | A1* | 12/2013 | Geradts | B60L 7/14 123/2 |
| 2014/0008988 | A1* | 1/2014 | Clarke | H02J 3/40 307/84 |
| 2014/0183941 | A1* | 7/2014 | Bae | B60L 3/0069 307/10.1 |

FOREIGN PATENT DOCUMENTS

| | | |
|---|---|---|
| WO | 2009077184 A1 | 6/2009 |
| WO | 2010091899 A1 | 8/2010 |
| WO | 2012113711 A2 | 8/2012 |

\* cited by examiner

Fig. 1

SUPPLY OF ELECTRIC ENERGY TO ELECTRIC TRACTION MOTORS AND ADDITIONAL ELECTRIC AUXILIARIES OF A RAILWAY VEHICLE

CROSS-REFERENCE TO RELATED APPLICATIONS

This application is the United States national phase of International Application No. PCT/EP2013/063977 filed Jul. 2, 2013, and claims priority to German Patent Application No. 10 2012 211 543.9 filed Jul. 3, 2012, the disclosures of which are hereby incorporated in their entirety by reference.

BACKGROUND OF THE INVENTION

Field of the Invention

The invention relates to an arrangement for supplying electric energy to electric traction motors in a railway vehicle and for supplying electric energy to additional electric auxiliaries for operation of the railway vehicle. Furthermore, the invention relates to a railway vehicle with such an arrangement. Moreover, the invention relates to a method for supplying electric traction motors and additional electric auxiliaries for or during the operation of the railway vehicle. The invention also relates to a method for manufacturing the arrangement and the railway vehicle.

The railway vehicle may, for example, be a locomotive. However, the invention is not restricted to this. Rather, the railway vehicle may, for example, be a train set.

Description of Related Art

Heretofore, a common arrangement for supplying electric energy to electric traction motors in a railway vehicle and for supplying electric energy to additional electric auxiliaries for operation of the railway vehicle comprised a minimum of two internal-combustion engines (in particular diesel engines), each of which is combined with an electric machine. During a so-called generator mode of operation of the electric machine, the electric machine generates electric energy, while it is driven by the internal-combustion engine. Due to this, the electric energy is available within the railway vehicle to supply electric consumers. The consumers in particular are the traction motor or traction motors that drive(s) a motion of the railway vehicle, and so-called auxiliaries, which do not immediately provide traction, but may in particular be absolutely necessary for driving the railway vehicle. Auxiliaries can in general be defined by the fact that electric energy is supplied to them from the usually present direct-current link through their own auxiliaries inverter or several own auxiliaries inverters. Auxiliaries include fans and other cooling devices that cool the internal-combustion engines, the traction motors and/or other devices necessary for driving operation (e.g. power converters). Furthermore, driving operation requires a brake system, and, therefore, brake system components such as air compressors are auxiliaries. Other examples of auxiliaries are the railway vehicle's fire extinguishing system, electronic devices for controlling the operation of the railway vehicle, battery chargers, heatings which are at least temporarily necessary for driving operation such as front window heating and/or lighting systems in the driver's cab. Optionally, those electrical installations may be distinguished from the auxiliaries which are provided merely for passenger comfort, e.g. lamps in the vehicle compartments. Such electrical installations on trains are usually supplied with electric energy from the so-called train connector. The train connector is connected to the direct-current link not via any of the auxiliaries inverters, but via a dedicated inverter.

It is known that the electric energy generated by the electric machines is fed into a direct-current link via at least one rectifier (hereinafter: generator rectifier, because alternating current generated by the generator is rectified). Typically, several inverters are connected to the direct-current link which generate the alternating current of the desired voltage level or within the desired voltage range which is required for the consumers and systems connected at the AC voltage side. In addition to the inverters, DC converters may be provided at their DC voltage side and/or transformers at their AC voltage side to alter the voltage level. Other power converters may also be connected to the direct-current link, either directly or indirectly. Moreover, other electric consumers, e.g. electrical installations provided for passenger comfort, such as lighting, air-conditioning and information systems, may be supplied with electric energy from the direct-current link, in addition to the auxiliaries mentioned, e.g. via an inverter other than one of those used for auxiliaries necessary for driving operation.

For example, the following devices are connected to the direct-current link: several traction motors of the railway vehicle via one or several traction inverters; a train current connector via an additional converter or directly; auxiliaries necessary for driving operation via an auxiliaries inverter. Moreover, additional converters may be connected to the direct-current link, e.g. for the purpose of converting into heat any excess energy which is supplied to the direct-current link when the railway vehicle is braked. An example of such an arrangement is described in WO 2009/077184 A1.

In cases where more than one internal-combustion engine exists and at least one electric machine is coupled with the internal-combustion engine, it is possible that just a part of the existing electric machines generates electric energy, while simultaneously another part of the electric machines is operated as motor(s), in particular to drive the assigned internal-combustion engine in no-load operation. The advantage of this is that the supply of fuel to the internal-combustion engine can be switched off. However, alternatively, it is also possible that at least one of the internal-combustion engines is running only at a low rotational speed and hence the electric machine(s) assigned generate(s) just a low amount of electric power, which e.g. does not, or not considerably, contribute to the electric power supplied to the direct-current link.

Accordingly, the presence of more than one combination of internal-combustion engine and machine enables part-load operation of the railway vehicle, i.e. operation in which not the maximum of the possible electric power is required. Therefore, part-load operation means a mode of operation in which the mechanical power of just a part of the internal-combustion engines is sufficient to provide the necessary electric power. In addition to reducing the fuel consumption of the internal-combustion engines, another advantage of part-load operation is lower exposure of the surroundings to noise. For instance, four internal-combustion engine/machine combinations may exist, each of which can, preferably, be operated independently of the other combinations, either in no-load operation or at the optimal performance point. Optionally, more than two modes of operation can be set for each combination, e.g. operation at medium power of the electric machine operated as a generator in addition to the two modes of operation mentioned.

With respect to the further possible features of an arrangement with more than one internal-combustion engine/machine combination, reference is made here in particular to the international patent application number PCT/EP 2012/052705, filed on Feb. 16, 2012. In particular, the entire content of that application is hereby incorporated into this present application.

Electric auxiliaries installed in addition to the electric traction motors and supplied with electric energy from the direct-current link in particular comprise such auxiliaries which are necessary for driving operation of the railway vehicle as mentioned above. Accordingly, if the auxiliaries inverter, via which these auxiliaries are electrically connected to the direct-current link, fails or has to be switched off, driving operation cannot be continued. This is the case although the direct-current link and the supply of the traction motors from the direct-current link may still be functioning.

SUMMARY OF THE INVENTION

One object of this present invention is to present a solution by means of which driving operation can be continued if the auxiliaries inverter fails or is switched off, in arrangements for supplying electric energy to electric traction motors in a railway vehicle and to additional electric auxiliaries for operation of the railway vehicle, where electric energy can be supplied to a direct-current link by at least two internal-combustion engine/machine combinations and where at least one traction motor, as well as auxiliaries necessary for driving operation, have to be supplied with electric energy from the direct-current link.

The invention is initially based on the insight that there may be different reasons why the power supply of the auxiliaries may fail, and that, depending on the reason, continued operation of the direct-current link and of the at least one traction motor is possible. Moreover, at least two engine/machine combinations are available, and it is, therefore, proposed that at least one of these combinations will be used in emergency operation to supply electric power to at least part of the auxiliaries, in particular to those auxiliaries which are necessary to continue driving operation. Preferably, the combination is used directly, without interposing the direct-current link, to supply electric energy to the auxiliaries. Therefore, in particular, an emergency operation electric line is provided, by means of which the electric machine or the electric machines of the combination is/are connected to an electrical connection via which in normal operation of the arrangement—with interposition of the auxiliaries inverter—, electric energy is transmitted to the auxiliaries from the direct-current link. Alternatively, it is possible to connect the emergency operation line to the auxiliaries not via the auxiliaries connector used also during normal operation, but in a different way. In any case, electric energy can be supplied to the auxiliaries by the first internal-combustion engine/machine combination mentioned, although the auxiliaries inverter is not used.

Examples of possible error causes, which nevertheless allow continued operation of the direct-current link, include failure of the control unit of the auxiliaries inverter, failure of electronic switches of the auxiliaries inverter without short-circuit, failure of a transformer via which the auxiliaries inverter supplies energy to the auxiliaries, and short-circuits of frequency filters used in combination with the auxiliaries inverter.

As a second internal-combustion engine/machine combination is available (and, optionally, additional such combinations), the supply of energy to the at least one traction motor from the direct-current link can be continued during emergency operation. To do this, at least one combination supplies electric energy generated by its electric machine or its electric machines to the direct-current link. Although full-load traction operation, for which all existing combinations need to supply electric energy to the direct-current link, is not possible during emergency operation, e.g. a minimum of 50 percent of the total electric power available is available for traction in the case of two identical combinations, so the railway vehicle can be operated to reach at least the next station or a repair station.

In particular, the following is proposed: An arrangement for supplying electric energy to electric traction motors in a railway vehicle and for supplying electric energy to additional electric auxiliaries for operation of the railway vehicle, in which the arrangement comprises the following:

At least two internal-combustion engines.

For each of the at least two internal-combustion engines, an electric machine assigned to it for generating electric energy, with the electric machine being mechanically coupled to the internal-combustion engine, so that during generator mode of operation of the electric machine the electric machine is driven by the internal-combustion engine, so that at least a first and a second internal-combustion engine/machine combination are formed.

At least one generator rectifier for rectifying alternating currents generated by the electric machines during the generator mode of operation of the respective electric machine.

A direct-current link which is electrically connected to the electric machines or to a part of the electric machines via the at least one generator rectifier, while the electric machine or the electric machines supplies or supply energy to the direct-current link, and which is electrically connected to at least one traction motor.

An auxiliaries inverter with a direct-voltage connector and an alternating-voltage connector, the auxiliaries inverter being connected to the direct-current link via the direct-voltage connector and to an auxiliaries connector of the auxiliaries via the alternating-voltage connector to supply electric energy from the direct-current link to the auxiliaries.

An emergency operation electric line by means of which the electric machine of the first internal-combustion engine/machine combination is connected to the auxiliaries during emergency operation, during which the auxiliaries inverter is out of operation, to supply energy to the auxiliaries during the emergency operation.

Furthermore, the scope of the invention includes a railway vehicle comprising the arrangement in one of the embodiments described above or below, with at least one traction motor of the railway vehicle being electrically connected to the direct-current link and with additional electric auxiliaries of the railway vehicle being connected, or being connectable, to the emergency operation line of the arrangement.

Furthermore, the following is proposed: A method for supplying electric energy to electric traction motors in a railway vehicle and for supplying electric energy to additional electric auxiliaries for operation of the railway vehicle, whereby:

At least two internal-combustion engines, each in combination with an assigned electric machine, are operated in such a way that at least one first and one second internal-combustion engine/machine combination are operated.

Driven by the internal-combustion engine, the electric machines generate alternating current during a generator mode of operation of the respective electric machine, which alternating current, in a first operating mode, is rectified by at least one generator rectifier and supplied to a direct-current link in the form of direct current.

The direct-current link supplies electric energy to at least one traction motor of the railway vehicle.

In the first operating mode, electric energy is drawn from the direct-current link and supplied to the auxiliaries via an auxiliaries inverter and via an auxiliaries connector.

In a second operating mode, in which the auxiliaries inverter is out of operation, and which is an emergency operation condition, electric energy is supplied to the auxiliaries by the electric machine of the first internal-combustion engine/machine combination through an emergency operation electric line, and, in particular, via the auxiliaries connector.

Furthermore, the following is proposed: A method for manufacturing an arrangement for supplying electric energy to electric traction motors in a railway vehicle and to additional electric auxiliaries for operation of the railway vehicle, whereby:

At least two internal-combustion engines are provided.

For each of the at least two internal-combustion engines, an assigned electric machine for generating electric energy is provided and mechanically coupled to the internal-combustion engine in such a way that, during generator mode of operation of the electric machine, the electric machine is driven by the internal-combustion engine, so that at least a first and a second internal-combustion engine/machine combination are formed.

The electric machines are electrically connected to a direct-current link via at least one generator rectifier for rectifying direct currents.

An electric traction connection is provided at the direct-current link for connecting at least one traction motor.

An auxiliaries inverter is provided and a direct-voltage connector of the auxiliaries inverter is connected to the direct-current link and an alternating-voltage connector of the auxiliaries inverter is connected to an auxiliaries connector for connecting the auxiliaries.

The electric machine of the first internal-combustion engine/machine combination is electrically connected to an electric supply line of the auxiliaries by means of an emergency operation electric line, and the electrical connection provided by the emergency operation electric line can be switched on by at least one emergency operation switch to enable emergency operation of the auxiliaries without the auxiliaries inverter, and, otherwise, the electrical connection can be switched off (in particular during normal operation, while the auxiliaries inverter is operated).

In practice, an internal-combustion engine/machine combination will usually have one single internal-combustion engine and one single electric machine which is mechanically coupled to the internal-combustion engine. However, it is not ruled out that more than one electric machine exists in the combination and is e.g. driven by the same internal-combustion engine. Moreover, it is not ruled out that the combination comprises more than one internal-combustion engine, the internal-combustion engines in that case jointly driving one or more than one electric machines.

During the so-called generator mode of operation, the electric machine or all electric machines of the respective combination generate electric energy. In normal operation, when electric energy is supplied to the auxiliaries from the direct-current link via the auxiliaries inverter, all electric machines operating as a generator at a given point in time, preferably supply the electric energy they generate to the direct-current link. As already mentioned above, it is possible, however, that at least one of the combinations does not generate electric power, or generates no considerable amount of electric power, but that e.g. the internal-combustion engine is run in no-load operation by the electric machine.

In particular, one machine power converter may be provided for each of the electric machines, with an alternating-voltage connector of the machine power converter being connected to the electric machine to operate the electric machine as a motor while it is in motor mode of operation. During motor mode of operation of an electric machine, in which the electric machine drives the internal-combustion engine combined with it, electric energy is supplied to the electric machine by one machine power converter. When manufacturing the arrangement, one machine power converter is provided for each electric machine and an alternating-voltage connector of the machine power converter is connected to the electric machine to operate the electric machine as a motor during its motor mode of operation.

It is preferred that each of the combinations is connected to the direct-current link via an assigned generator rectifier for rectifying alternating currents generated by the electric machines during the generator mode of operation of the electric machine or the electric machines of the combination. In particular, if at least one of the combinations is connected to a generator rectifier via a circuit breaker, several combinations can use the same generator rectifier jointly in case of a different embodiment. If it is desired that one of the combinations shall not supply electric energy to the direct-current link, the circuit breaker is opened. Therefore, the direct-current link is electrically connected to the electric machines or a part of the electric machines via the at least one generator rectifier when the electric machine or electric machines supply energy to the direct-current link. Moreover, the direct-current link is electrically connected to at least one traction motor, e.g. via a traction inverter. As already mentioned—and this not only applies to the case where several combinations use a common generator rectifier—, the combination may be connected to the direct-current link via a circuit breaker, and the circuit breaker can be opened while the combination does not supply electric energy to the direct-current link.

An auxiliaries inverter is installed, which optionally may also be a distributed system, i.e. inverter units electrically isolated from each other and e.g. inverter units which are electrically connected with each other only via the direct-current link may generate alternating current during operation which can be used to operate the auxiliaries. The individual inverter units may have a common control unit.

The invention also relates to cases where the direct-current link is a distributed system in which at least two direct-current link sub-circuits exist, each with a high and a low electric potential, and e.g. a traction inverter is connected to the one sub-circuit and the auxiliaries inverter or an inverter unit is connected to a second sub-circuit. Optionally, the sub-circuits may be electrically coupled, e.g. by means of circuit breakers that connect the two high potentials and the two low potentials. Accordingly, the various internal-combustion engine/machine combinations may be connected either exclusively to one of the sub-circuits or in parallel to more than one of the sub-circuits.

For each of the combinations, and hence separately for the electric machine or the electric machines of the combination, preferably one machine power converter is provided. Where a combination includes more than one electric machine, the same machine power converter may operate several electric machines in motor mode of operation. A special case of motor mode of operation is the start of the combination, where the at least one machine power converter that is assigned to the combination supplies electric energy to the at least one electric machine of the combination or to at least one of the electric machines of the combination, so that the at least one electric machine starts the internal-combustion engine or the internal-combustion engines of the combination. However, alternatively, it is possible that at least one of the combinations has an additional starter which starts the internal-combustion engine. In that case, the machine power converter is dispensable.

While none of the combinations which are electrically connected to the direct-current link in a given operating mode of the arrangement has started, the electric energy which can be drawn from the direct-current link is normally not sufficient to start at least one combination, i.e. the electric power of the direct-current link, including usually existing capacitors, is not sufficient. Therefore, as usual, there is at least one additional energy storage, e.g. an electrochemical energy storage, from which the energy for starting at least one combination is drawn. However, it is preferred to start the other combination or the other combinations using energy from the direct-current link as soon as sufficient energy has been fed into the direct-current link from one of the already started combinations. Accordingly, there are several options to supply electric energy to the machine power converters or additional starters. The machine power converters in particular are machine inverters, the AC voltage side of which is connected to the electric machine or the electric machines of the assigned combination and the DC voltage side of which is e.g. connected to the additional energy storage and/or, via another electric converter, to the direct-current link. The other electric converter may be a rectifier which is connected to the AC voltage side of the auxiliaries inverter. Furthermore, a voltage converter may optionally be provided (e.g. a transformer), via which the AC voltage side (i.e. the alternating-voltage connector) of the auxiliaries inverter is connected to the additional electric converter (in particular, the rectifier). In this way, the voltage converter can provide a voltage level suitable for the supply of power to the machine power converter or converters or the starter or starters.

At least on of the generator rectifiers, which is assigned to one of the combinations and which is preferably assigned exclusively to that particular combination, may be identical to the machine power converters of the combination. In that case, the power converter has an alternating-voltage connector which is connected to the at least one electric machine of the combination and has a direct-voltage connector which is connected to the direct-current link. While the at least one electric machine is generating electric energy, the power converter is working as a generator rectifier. While electric energy is being drawn from the direct-current link for the motor mode of operation of the at least one electric machine of the combination, the power converter is working as a machine inverter. In particular, the power converter may be electrically connected, or be connectable, to the already mentioned additional energy storage (e.g. vehicle battery) (e.g. by means of at least one circuit breaker, which is closed to connect the power converters). Therefore, energy can be drawn from the additional energy storage for the motor mode of operation of the at least one electric machine of the combination (as an alternative to drawing electric energy from the direct-current link). It is even possible that in the motor mode of operation energy is drawn always exclusively from the additional energy storage and that energy is never drawn from the direct-current link for the motor mode of operation. In that case, e.g. a isolating switch is located between the power converter and the direct-current link. However, it is preferred to draw energy from the direct-current link, provided this is possible in the prevailing operating situation.

However, it is preferred that the generator rectifier and the machine power converter are different installations.

Variants of the operating procedure mentioned above and variants of the manufacturing method mentioned above follow from the description of variants of the arrangement and the railway vehicle. For example, where an additional electrical component and/or an additional electrical connection of the arrangement is described, this corresponds to a process step of the manufacturing method in which the component and/or the connection is provided. With respect to the operating procedure, this corresponds to the operation of the component and/or the connection. In particular, the arrangement may comprise a control arrangement with control units, which is designed to control the controllable switches and converters of the arrangement in such a way that the operating procedure can be carried out. For instance, at the start of emergency operation, a control unit may close the emergency operation switch and a control unit may open the switch between the first combination and the generator rectifiers or between the generator rectifier and the direct-current link. Additional control units exist in particular for each of the power converters (generator rectifiers, machine power converter, auxiliaries inverter). Preferably, the control units are connected with each other and/or, as part of a control system, with a higher-level control unit.

Possible modes of operation of the at least two internal-combustion engine/machine combinations have been dealt with already above. In particular, at least two combinations allow part-load operation of the railway vehicle, even if there is no emergency operation e.g. due to a failed auxiliaries inverter. No emergency operation means that the arrangement or the railway vehicle is in the first operating mode, in which electric energy is supplied to the direct-current link by at least one of the combinations via the at least one generator rectifier and electric energy is drawn from the direct-current link and supplied to the auxiliaries via the auxiliaries inverter.

In the second operating mode—the emergency operation condition—as well, electric energy can be supplied to the direct-current link from at least one combination via the at least one generator rectifier, e.g. for traction motors. However, in that second operating mode, there is at least one combination that supplies electric energy to the auxiliaries directly via the emergency operation line. Accordingly, electric energy can be supplied both to at least one traction motor and to the auxiliaries necessary for driving operation, even if, for example, an auxiliaries inverter has failed.

Upon transition from the first operating mode to the second operating mode, in particular an emergency operation switch is closed, by which the electrical connection of the at least one electric machine of the first combination with the auxiliaries is established which is routed via the emergency operation line. By contrast, when the emergency operation switch is open in the first operating mode, the emergency operation electric line exists, but the connection which it can establish is interrupted by the emergency operation switch. The emergency operation switch may be located at a place along the emergency operation line or at one end of the emergency operation line. Also, more than one emergency operation switch may be provided.

Preferably, the electrical connection of the emergency operation line in the second operating mode, i.e. during emergency operation, exists from the at least one electric machine of the first combination to the auxiliaries connector, via which electric energy is supplied to the auxiliaries also during the first operating mode. In that case, it is preferred that an isolating switch is installed between the alternating-voltage connector of the auxiliaries inverter and the auxiliaries connector, by means of which the auxiliaries inverter can be disconnected from the auxiliaries connector for emergency operation. Therefore, upon transition from the first to the second operating mode, that isolating switch is preferably opened, so that the alternating-voltage connector of the auxiliaries inverter is disconnected from the auxiliaries connector and the electric energy can be transferred to the auxiliaries directly by means of the emergency operation line and the auxiliaries connector.

BRIEF DESCRIPTION OF THE DRAWINGS

In the following, embodiments of the invention are described making reference to the enclosed drawing. The individual figures of the drawing show the following.

Figure 1:
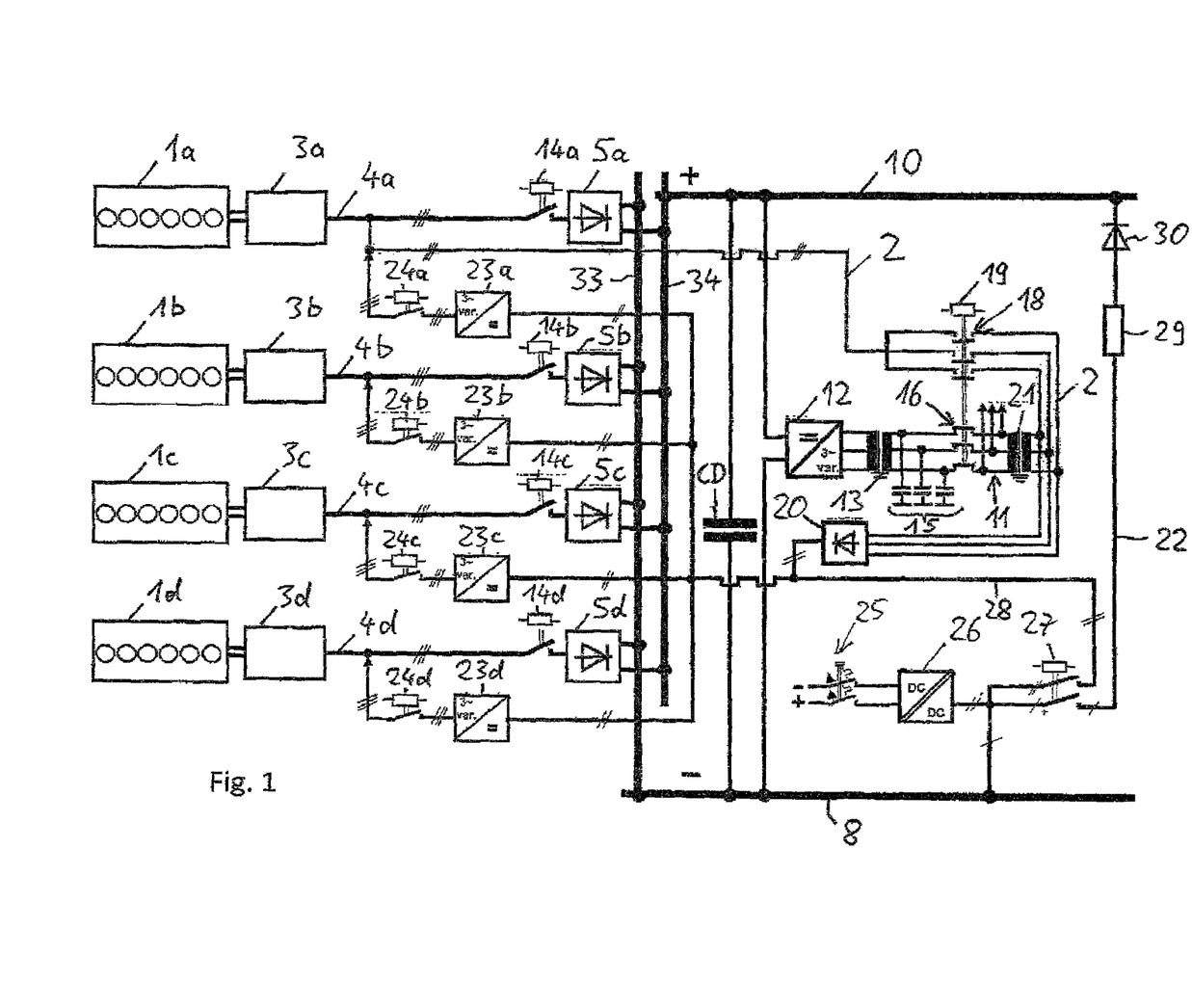
FIG. 1 A first embodiment of an arrangement for supplying electric energy to at least one traction motor and additional electric auxiliaries in a railway vehicle.

The embodiment shown in FIG. 1 features four internal-combustion engine/machine combinations 1, 3, with the internal-combustion engines 1a, 1b, 1c, 1d preferably being diesel engines. The electric machines 3a, 3b, 3c, 3d are, for example, permanent magnet synchronous motors.

DETAILED DESCRIPTION OF THE INVENTION

Each of the combinations 1, 3 is connected to a generator rectifier 5a, 5b, 5c, 5d assigned to the combination 1, 3, via a three-phase connector line 4a, 4b, 4c, 4d. The three-phase connector line 4 of each of the combinations is routed via a three-phase isolating switch 14a, 14b, 14c, 14d, so that the three-phase electrical connection between the electric machine 3 and the generator rectifier 5 can be interrupted, in particular when the electric machine 3 of the combination 1, 3 is operated as a motor. The rectifiers 5 are connected to the direct-current link with the lines 8, 10, via connecting lines 33, 34 designed as collecting lines for all rectifiers 5.

With its two DC voltage side connector lines, an auxiliaries inverter 12 is connected to the lines 8, 10 of the direct-current link. With its three-phase AC voltage side, the auxiliaries inverter 12 is connected to an auxiliaries connector 11, via an isolating transformer 13 and a filter arrangement 15, which is e.g. designed as a sinusoidal filter, and via a switch 16. In FIG. 1, the electrical connections from the auxiliaries connector 11 to the auxiliaries not shown here are represented by three parallel arrows pointing upward.

Furthermore, via another transformer 21, the auxiliaries connector 11 is connected to the AC voltage side of a rectifier 20 and to a three-phase emergency operation line 2 running to the three-phase connector line 4a of the first combination 1a, 3a via an isolating switch 18. At least one of the transformers 13, 21 can be omitted or replaced by an other voltage converter. The advantage of a transformer or voltage converter between the auxiliaries inverter 12 and the auxiliaries connector 11 is that, in addition to the auxiliaries inverter 12, the voltage can be adjusted to the voltage level required for the auxiliaries. In particular, a transformer 13, moreover, effects galvanic isolation. The additional transformer 21 likewise enables voltage adjustment, both in emergency operation and when energy is supplied to the electric machines 3 from the direct-current link for their motor mode of operation, which voltage adjustment, as already mentioned, can also be achieved by an other voltage converter. For the purpose of this energy supply from the direct-current link, the already mentioned rectifier 20 is connected to DC voltage connectors of the machine inverters 23a, 23b, 23c, 23d. The AC voltage sides of the machine inverters 23 are each connected to the three-phase connector line 4 of the combination by means of a switch 24a, 24b, 24c, 24d.

The advantage of coupling the emergency operation line 2 via an additional transformer 21 or via a voltage converter—the AC voltage side of the rectifier 20 for supplying the machine inverters likewise being connected to the auxiliaries connector 11 via the voltage converter—is that the voltage level can be adjusted by means of just one voltage converter and that the voltage at the auxiliaries connector 11 in particular may be lower than in the emergency operation line and for the supply of the machine inverters. Therefore, such a solution is generally preferred, irrespective of the embodiment shown in FIG. 1.

Preferably, as shown in FIG. 1, the three-pole switch 16 between the AC voltage side of the auxiliaries inverter 12 and the auxiliaries connector 11, and the isolating switch 18 in the emergency operation line 2, are actuated by a common control unit 19. Upon transition from normal operation, in which electric energy is supplied to the auxiliaries from the direct-current link 8, 10 via the auxiliaries inverter 12, to emergency operation, in which the auxiliaries are supplied via the emergency operation line 2, the control unit 19 controls the switches 16, 18 in such a way that the switch 16 is opened and the isolating switch 18 is closed. Consequently, in normal operation, at least one of the combinations 1, 3 supplies electric energy generated by its electric machine 3 to the direct-current link 8, 10, via the three-phase connector line 4 and the generator rectifier 5, that energy being available to the auxiliaries via the auxiliaries inverter 12, and also to at least one traction motor of the railway vehicle, via at least one traction inverter not shown. By contrast, in the embodiment shown in FIG. 1, in emergency operation, the electric machine 3a of the first combination 1, 3 supplies electric energy generated by it into the respective connecting lines leading to the auxiliaries, via the emergency operation line 2 and the optionally provided voltage converter 21. At the same time, at least one additional combination 1b, 3b, 1c, 3c, 1d, 3d can generate electric energy with its electric machine 3 and supply that electric energy to the direct-current link 8, 10 via the three-phase connector line 4b, 4c, 4d and the generator rectifier 5b, 5c, 5d. That energy is then available to at least one traction motor, in a similar way as in normal operation. Optionally, energy can be drawn from the direct-current link 8, 10 for other applications, both in normal operation and in emergency operation, e.g. for electrical installations not absolutely necessary for driving operation which are e.g. connected via the train connector in the case of a train.

In the usual fashion, a capacitor CD is installed between the lines 8, 10 of the direct-current link to equalize DC voltage fluctuation and/or to absorb energy.

Moreover, another electric line 28 is connected to the DC voltage side of the rectifier 20 for supplying the machine inverters 23, which in particular has two poles and allows to draw energy from an electric energy storage (e.g. vehicle battery) via a switch 27 and a voltage converter 26, and via an optional protective switch 25. Accordingly, at least one of the machine inverters 23 can be operated with energy from the additional energy storage. In particular in emergency operation, when none of the internal-combustion engines 1 has yet started, energy is in this way drawn from the additional energy storage and used to start at least one combination 1, 3. For instance, the combination 1b, 3b is started first, then its electric machine 3b is operated as a generator, and the electric energy generated is supplied to the direct-current link 8, 10 via the generator rectifier 5b. That energy is thus available to operate at least one traction motor and, optionally, other consumers, using the direct-current link.

Alternatively, the combination 1a, 3a may be started first by drawing energy from the additional energy storage and supplying it to its machine inverter 23 via the line 28. After starting, the electric machine 3a can be operated as a generator and supply its electric energy through the emergency operation line 2. That energy can then be used to start other combinations 1, 3 via the rectifier 20.

In an embodiment which is an alternative to FIG. 1, the electric energy required for starting a combination can be supplied to the machine inverter of the combination directly from the direct-current link once one of the combinations has started which supplies energy to the direct-current link. This mode of operation is possible e.g. in the embodiment described in the following.

Moreover, the voltage converter 26 is connected to the line 10 at the higher electric potential of the direct-current link, via a resistor 29 and a diode 30. The line 22 can be disconnected from the voltage converter 26 by means of the switch 27. The direct-current link can be pre-charged via the line 22, i.e. an electric potential can be generated between line 10 and line 8. By closing the switches 14, this prevents short-circuit currents when the generators 3 are connected.

Figure 2:
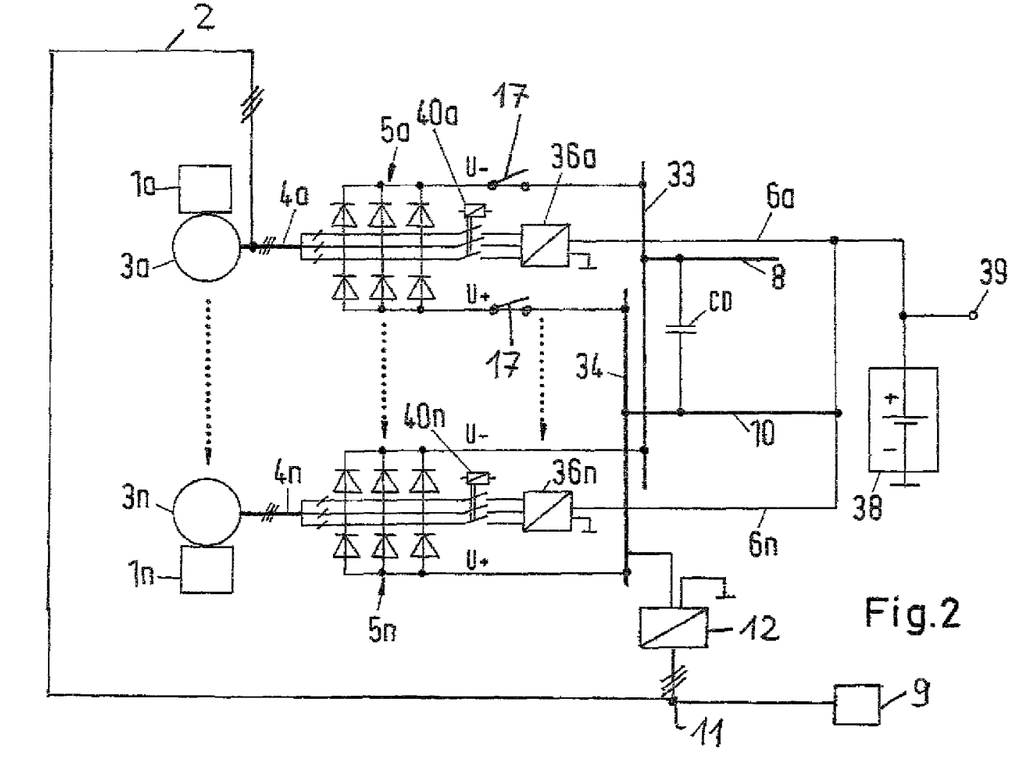
FIG. 2 a second embodiment of an arrangement for supplying electric energy to at least one traction motor and additional electric auxiliaries in a railway vehicle.

FIG. 2 shows an arrangement similar to that in FIG. 1. Details of individual components of the arrangement are shown. Identical reference signs, in particular identical numbers, refer to the same or corresponding components as in FIG. 1. In particular, additional characteristic features of the arrangement shown in FIG. 1, which are not shown in FIG. 2, may also exist in the arrangement, e.g. the isolating switch between the alternating-voltage connector of the auxiliaries inverter and the auxiliaries connector.

The arrangement comprises n combinations, each with an internal-combustion engine 1a . . . 1n and a mechanically coupled generator 3a . . . 3n, where n is a positive integer. In practice, e.g. two or four such combinations occur in a locomotive or other railway vehicle.

Each of the combinations 1, 3 is connected to a generator rectifier 5a . . . 5n, via a three-phase connector line 4a . . . 4n. In the embodiment, the rectifiers 5 are non-controlled three-phase bridge circuits. The different potentials at the DC voltage sides of the rectifiers 5 are termed U+ and U−, respectively. The connections of the rectifiers 5 with the direct-current link, with the lines 8, 10, are established via connecting lines 33, 34 designed as collecting lines for all rectifiers 5.

As an alternative, several direct-current links might be provided, each of which supplies electric energy to at least one traction motor. In that case, however, there is at least one direct-current link to which the auxiliaries inverter is connected.

In the embodiment shown in FIG. 2, the one potential of the direct-current link—the higher potential U+ (line 10)—is electrically connected to a machine inverter 36a . . . 36n of the respective combination 1, 3, each via one additional connecting line 6a . . . 6n. The other potential of the direct-current link—the lower potential U− (line 8)—is e.g. connected to vehicle ground. Furthermore, in the embodiment, a vehicle energy storage 38 (e.g. an electrochemical storage) for storing electric energy is connected to the line 10 of the direct-current link, e.g. via a DC/DC converter (not shown). By means of a connector 39, the energy storage 38 and/or the direct-current link can be charged additionally, e.g. via a so-called batter charger, which may also be the DC/DC converter.

The machine inverters 36 are connected to the three-phase line 4a . . . 4n by means of a three-phase line and an isolating contactor 40a . . . 40n.

In an alternative embodiment, a converter may be provided instead of the uncontrolled rectifier bridge and the generator-inverter, which converter can be operated both as a rectifier (during generator mode of operation of the electric machine 3) and as an inverter (during motor mode of operation of the electric machine 3). The advantage of the embodiment shown in FIG. 2, with separate rectifier bridge and generator-inverter, is that the machine inverter can be dimensioned for the transmission of lower electric voltages and powers than the rectifier bridge, because just low power is required in the motor mode of operation of the electric machine 3 to run the internal-combustion engine at no-load speed. By contrast, a controlled or regulated integrated converter for both rectification and power inversion would have to be dimensioned for high power during traction operation.

At least one of the combinations, to with the combination 1a, 3a in the embodiment, can be disconnected from the direct-current link 8, 10 by means of a switch 17. In the embodiment shown in FIG. 2, the switch 17 is located between the DC voltage side of the rectifier 5a and the connecting lines 33, 34. The switch has two poles. Alternatively, the switch may be located in the three-phase connector line 4a, as shown in the example in FIG. 1, and hence have three poles. In either case, when the switch 17 is opened, the combination is disconnected from the direct-current link, and the combination 1a, 3a can supply electric energy to the auxiliaries 9 via the emergency operation line 2. In the example of FIG. 2, the emergency operation line 2 has three phases as well, as in FIG. 1, and is connected to the auxiliaries connector. Switches for interrupting the emergency operation line 2 or for disconnecting the emergency operation line 2 from the auxiliaries connector 11, and switches for disconnecting the auxiliaries inverter 12, which is connected to the direct-current link at its DC voltage side, are not shown in FIG. 2. They may be designed in particular as shown in FIG. 1. In FIG. 2, the auxiliaries inverter 12 is, at the DC voltage side, connected directly to the connecting line 34 at the higher potential and, with the other DC voltage side connector, connected to vehicle ground. Alternatively, the auxiliaries inverter 12 may be connected directly to a line of the direct-current link, e.g. line 8 or connecting line 33.

The invention claimed is:
1. An arrangement for supplying electric energy to electric traction motors in a railway vehicle and for supplying electric energy to additional electric auxiliaries for operation of the railway vehicle, in which the arrangement comprises the following:

- at least two internal-combustion engines;
- for each of the at least two internal-combustion engines, an electric machine assigned to it for generating electric energy, with the electric machine being mechanically coupled to the internal-combustion engine, so that during generator mode of operation of the electric machine the electric machine is driven by the internal-combustion engine, so that at least a first and a second internal-combustion engine/machine combination are formed;
- at least one generator rectifier for rectifying alternating currents generated by the electric machines during generator mode of operation of the respective electric machine;
- a direct-current link which is electrically connected to the electric machines or some of the electric machines via the at least one generator rectifier, while the electric machine or the electric machines supplies or supply energy to the direct-current link, and which is electrically connected to at least one traction motor;
- an auxiliaries inverter with a direct-voltage connector and an alternating-voltage connector, the auxiliaries inverter being connected to the direct-current link via the direct-voltage connector and to an auxiliaries connector of the auxiliaries via the alternating-voltage connector to supply electric energy from the direct-current link to the auxiliaries;
- an emergency operation electric line by means of which the electric machine of the first internal-combustion engine/machine combination is connected to the auxiliaries during emergency operation, during which the auxiliaries inverter is out of operation, to supply energy to the auxiliaries during emergency operation, the electric machine of the first internal-combustion engine/machine combination being electrically connected to the direct-current link, via the generator rectifier or via one of the generator rectifiers, while the electric machine of the first internal-combustion engine/machine combination supplies energy to the direct-current link; and
- switches which, during emergency operation, disconnect the auxiliaries inverter from the auxiliaries connector and couple the electric machine of the first internal-combustion engine/machine combination to the auxiliaries via the emergency operation electrical line.

2. The arrangement according to claim 1, in which, during emergency operation, the electric machine of the second internal-combustion engine/machine combination is connected to the direct-current link, via the generator rectifier or via at least one of the generator rectifiers, to supply electric energy from the direct-current link to the at least one traction motor connected to the direct-current link.

3. The arrangement according to claim 1, wherein the switches include a first switch located between the alternating-voltage connector of the auxiliaries inverter and the auxiliaries connector, which, during emergency operation, disconnects the auxiliaries inverter from the auxiliaries connector.

4. The arrangement according to claim 1, wherein the switches include a second switch combined with the emergency operation electrical line, via which second switch the electrical connection between the emergency operation electrical line from the electric machine of the first internal-combustion engine/machine combination to the auxiliaries is established only during emergency operation.

5. The arrangement according to claim 1, in which one machine inverter is provided for each of the electric machines, with an alternating-voltage connector of the machine inverter being connected to the electric machine to operate the electric machine as a motor during a motor mode of operation of the electric machine, the arrangement having an electrical connector for connecting an energy storage, from which electric energy is capable of being drawn, and where the electrical connector is connected to at least one of the machine inverters to supply energy from the energy storage for the motor mode of operation of the electric machine.

6. The arrangement according to claim 1, in which a machine inverter is provided for each of the electric machines, with an alternating-voltage connector of the machine inverter being connected to the electric machine to operate the electric machine as a motor during a motor mode of operation of the electric machine, and with the direct-current link being connected to at least a part of the machine inverters to supply energy from the direct-current link to the respective electric machine during the motor mode of operation.

7. A railway vehicle, featuring an arrangement according to claim 1, with at least one traction motor of the railway vehicle being electrically connected to the direct-current link and additional electric auxiliaries of the railway vehicle being connected or connectable to the emergency operation electrical line of the arrangement.

8. A method for supplying electric energy to electric traction motors in a railway vehicle and for supplying electric energy to additional electric auxiliaries for operation of the railway vehicle, whereby:

- at least two internal-combustion engines, each in combination with an assigned electric machine, are operated in such a way that at least one first and one second internal-combustion engine/machine combination are operated;
- driven by the internal-combustion engine, the electric machines generate alternating current during a generator mode of operation of the respective electric machine, which alternating current, in a first operating mode, is rectified by at least one generator rectifier and supplied to a direct-current link in the form of direct current;
- the direct-current link supplies electric energy to at least one traction motor of the railway vehicle;
- in the first operating mode, electric energy is drawn from the direct-current link and supplied to the auxiliaries via an auxiliaries inverter and via an auxiliaries connector; and
- in a second operating mode, in which the auxiliaries inverter is out of operation, and which is an emergency operation condition, electric energy is supplied to the auxiliaries by the electric machine of the first internal-combustion engine/machine combination through an emergency operation electric line, wherein, during the emergency operation condition, switches disconnect the auxiliaries inverter from the auxiliaries connector and couple the electric machine of the first internal-combustion engine/machine combination to the auxiliaries via the emergency operation electrical line.

9. The method according to claim 8, whereby, during the emergency operation condition, the electric machine of the second internal-combustion engine/machine combination supplies electric energy to the direct-current link, via the generator rectifier or via at least one of the generator rectifiers, and electric energy from the direct-current link is supplied to the at least one traction motor.

10. The method according to claim 8, whereby, for changing from the first operating mode to the second operating mode, the switches include a first switch between an alternating-voltage connector of the auxiliaries inverter and an auxiliaries connector, wherein, during the emergency operation condition, the first switch is opened to electrically isolate the auxiliaries inverter from the auxiliaries connector.

11. A method for manufacturing an arrangement for supplying electric energy to electric traction motors in a railway vehicle and for supplying electric energy to additional electric auxiliaries for operation of the railway vehicle, whereby:
  at least two internal-combustion engines are provided;
  for each of the at least two internal-combustion engines, an assigned electric machine for generating electric energy is provided and mechanically coupled to the internal-combustion engine in such a way that, during generator mode of operation of the electric machine, the electric machine is driven by the internal-combustion engine, so that at least a first and a second internal-combustion engine/machine combination are formed;
  the electric machines are electrically connected to a direct-current link via at least one generator rectifier for rectifying direct currents;
  an electric traction connection is provided at the direct-current link for connecting at least one traction motor;
  an auxiliaries inverter is provided and a direct-voltage connector of the auxiliaries inverter is connected to the direct-current link and an alternating-voltage connector of the auxiliaries inverter is connected to an auxiliaries connector for connecting the auxiliaries; and
  the electric machine of the first internal-combustion engine/machine combination is electrically connected to an electrical line of the auxiliaries by means of an emergency operation electric line, wherein, during an emergency operation of the auxiliaries, a first switch disconnects the auxiliaries inverter from the auxiliaries connector and a second switch couples the electric machine of the first internal-combustion engine/machine combination to the auxiliaries via the emergency operation electrical line to enable the emergency operation of the auxiliaries without the auxiliaries inverter.

12. The method according to claim 11, in which the first switch is located between an alternating-voltage connector of the auxiliaries inverter and the auxiliaries connector, and the first switch is operative for isolating the auxiliaries inverter from the auxiliaries connector for the emergency operation of the auxiliaries.

13. The method according to claim 11, whereby one machine inverter is provided for each of the electric machines, with an alternating-voltage connector of the machine inverter being connected to the electric machine to operate the electric machine as a motor during a motor mode of operation of the electric machine, and with an electrical connector for connecting an energy storage, from which electric energy is capable of being drawn, being connected to at least one of the machine inverters to supply energy from the energy storage for the motor mode of operation of the electric machine.

14. The method according to claim 11, whereby the direct-current link is connected to at least one of the machine inverters to supply energy from the direct-current link to the respective electric machine during a motor mode of operation.

15. The method according to claim 9, whereby, for changing from the first operating mode to the second operating mode, a first switch between an alternating-voltage connector of the auxiliaries inverter and the auxiliaries connector is opened to electrically isolate the auxiliaries inverter from the auxiliaries connector.

16. The method according to claim 12, whereby one machine inverter is provided for each of the electric machines, with an alternating-voltage connector of the machine inverter being connected to the electric machine to operate the electric machine as a motor during a motor mode of operation of the electric machine, and with an electrical connector for connecting an energy storage, from which electric energy is capable of being drawn, being connected to at least one of the machine inverters to supply energy from the energy storage for the motor mode of operation of the electric machine.

17. The method according to claim 12, whereby the direct-current link is connected to at least one of the machine inverters to supply energy from the direct-current link to the respective electric machine during a motor mode of operation.

18. The method according to claim 13, whereby the direct-current link is connected to at least one of the machine inverters to supply energy from the direct-current link to the respective electric machine during a motor mode of operation.

* * * * *